United States Patent [19]

Hagen et al.

[11] Patent Number: 4,546,864
[45] Date of Patent: Oct. 15, 1985

[54] ONE-WAY CLUTCH

[75] Inventors: Max Hagen, Frankfurt; Johannes Sebulke, Friedrichsdorf, both of Fed. Rep. of Germany

[73] Assignee: Ringspann Albrecht Maurer K.G., Bad Homburg, Fed. Rep. of Germany

[21] Appl. No.: 519,692

[22] Filed: Aug. 2, 1983

[30] Foreign Application Priority Data

Aug. 10, 1982 [DE] Fed. Rep. of Germany ....... 3229685

[51] Int. Cl.[4] .............................................. F16D 41/07
[52] U.S. Cl. .................................. 192/41 A; 192/45.1
[58] Field of Search ................... 192/41 A, 45.1, 45.2; 188/82.8

[56] References Cited

U.S. PATENT DOCUMENTS

| | | | |
|---|---|---|---|
| 3,443,672 | 5/1969 | Giese | 192/45.1 |
| 3,598,212 | 8/1971 | Giese | 192/45.1 |
| 3,702,649 | 11/1972 | Giese et al. | 192/41 A |

Primary Examiner—Samuel Scott
Assistant Examiner—Allen J. Flanigan
Attorney, Agent, or Firm—Frishauf, Holtz, Goodman & Woodward

[57] ABSTRACT

To permit use of essentially circular, disk-like engagement elements (8) in a free-wheeling clutch, which can rotate to permit one-way free-wheeling operation while interfering with relative free rotation in the other direction, a coil spring (7) with two projecting spring arms (7a, 7b) is located in a recess of a radial surface (5) formed in an opening (2) in the cage ring, and the ring as well as the engagement elements are formed additionally with first and second cooperating surface pairs (3a, 8d; 4c, 8c) located at different diametrical dimensions with respect to a pivot axis of the engagement element, the spring arms (7a, 7b) engaging against essentially radially—with respect to the pivot axis—extending transition engagement surfaces (8e, 8f) between the respective different diametrical, essentially circular surfaces of the engagement element. The larger one of the matching surfaces (8d, 3a) is undercut with respect to a diametrically extending insertion opening so that, after rotation of the elements and preliminary compression of the spring, the spring will rotate the elements, so that the matching circular surfaces fit against each other, thereby retaining the elements in position without danger of inadvertent removal or loss.

14 Claims, 4 Drawing Figures

ONE-WAY CLUTCH

BACKGROUND

U.S. Pat. No. 3,598,212, GIESE, describes a one-way structure in which a retainer ring forming, for example, a clutch sprag or clutch element, in a cage ring, is located between a coaxially placed driving member and a driven member. The ring is formed as a central ring with elongated holes in which tiltable sprags are disposed. The sprags can be inserted in a predetermined first angular position in openings of the ring or cage, and are then pivoted under influence of a spring into their normal or quiescent position. The sprags are retained in place by interengaging projections or heads which project in circumferential direction with respect to the central or a pinched zone of the sprags, so that the sprags are automatically retained against removal from the cage, even before the cage is installed or assembled between an inner race and an outer race forming, respectively, a driven and a driving element of the one-way clutch.

Assembling the sprags is possible only with sprag elements which have a pinched central portion. Spring elements which are essentially of circular appearance cannot be assembled in this manner. Sprag elements with essentially circular shape, however, are substantially cheaper to make. Such sprag elements are, usually, guided on bowed, roughly radially extending guide surfaces of the cage, being guided in circumferential direction. No projecting head elements which prevent removal of the sprags can be present in such a construction, so that loss of sprag elements during and before assembly is difficult to prevent. Assembly of such essentially circular clamping or sprag elements may be entirely impossible for one-way clutches which should pivot or otherwise move already at low rotary speed under centrifugal force, by shifting position and lifting off either the inner or the outer race. Some clearance to the respective race is necessary.

In order to assemble sprags or friction-engaging elements of essentially circular shape, it is necessary to insert these elements before assembly into the cage or ring structure, together with the associated biassing springs. This requires multi-component cages, resulting in manufacturing and assembly costs which are higher than the unitary single-element cage or ring of the aforementioned U.S. Pat. No. 3,598,212, so that the cost advantage of the better, essentially circular friction elements is not effectively obtained in the overall clutch.

THE INVENTION

It is an object to provide a clutch, and more particularly a clutch cage ring for one-way clutches, which permits insertion of clamping or clutching elements with essentially circular shape by radial positioning thereof into a one-element or unitary ring cage structure and to retain these clamping elements therein such that they cannot be lost or inadvertently removed.

Briefly, the clutch has clutch rings between which a clutch element holding cage ring is concentrically positioned. Friction-engaging elements are secured to the cage ring and pivotally mounted thereon for engagement with the clutch rings in one relative direction of rotation of the rings and sliding contact with the clutching rings in the reverse direction of rotation. Spring elements are provided engageable with the friction elements which are located at a radial surface face of the cage ring.

In accordance with a feature of the invention, the spring element has a pair of projecting spring legs which are resiliently biassed for spreading-apart movement. The clutching elements have a spring working engagement surface for engagement with one of the legs, and a retaining surface for engagement with the other of the legs. The clutching elements, as well as the cage ring, are formed with a first matching cooperating surface pair, and an essentially diametrically oppositely positioned second clutching cooperating surface pair, located at a different diametrical position with respect to the pivot axes than the first matching surfaces, engagement of the retaining surfaces of the clutching element by the other spring leg rotating the element about the pivot axis to a position in which the cooperating surface pairs are opposite each other.

The arrangement is so made that the arm of the spring which engages on the cage ring, upon radial insertion of the friction engaging element, corresponds with a surface of the element itself and can be pivoted out of its retaining position, upon resilient release of the spring which, to pivot it out of the position, has to be compressed against spring force, the friction engagement element is pivoted into its quiescent position and held within the ring structure of the cage ring in such a manner that it cannot be lost, by forming, respectively, the cooperating surface pairs such that upon pivoting under spring force, the shape of the surface pairs will prevent removal of the friction engaging elements from the holding ring.

Essentially, the invention is based on the concept that one end of the spring which, for example, is a coil spring with projecting legs, under ordinary operation only is positioned on a fixed counter surface and assembled with some clearance within the cage ring. Upon insertion of the associated friction engaging element, the arm of the spring can resilient yield and, after the insertion, will pivot the friction engaging element into its quiescent position, from which, however, it can no longer be removed, or from the cage, without compression of the spring. The arm of the spring which, prior to the present invention, had no function other than forming a projection for engagement with a counter surface thus receives, in accordance with a feature of the invention, an additional function, namely to insure positioning of the friction engaging elements in a manner such that they cannot be removed from the clutching ring.

Upon assembly of a cage ring, together with the friction engaging elements thereof within an interior and an exterior clutching ring, for example, the respective engagement elements are pivoted from their quiescent position into an operating position. This renders the said arm of the spring inactive, the other arm of the spring, however, then engaging the respective friction engaging elements so that they can carry out the customary biassing function with respect to the friction engaging elements.

The structure of the invention has the advantage that engagement elements of essentially circular or at least part-circular structure can be used, which can be assembled on the clutching ring in simple manner, and being held thereon without possibility of loss or inadvertent removal. The simple shape of the engagement elements permits inexpensive manufacture, and a unitary ring structure is made possible. The arrangement of the clutch itself can be in accordance with various desired operating modes.

In accordance with a preferred feature of the invention, engagement surfaces within the cage ring are provided to prevent excessive twisting of the coil spring, by engagement of the support arm with the engaging element. This arrangment also simplifies assembly of the engaging elements since, likewise, an abutment or stop surface for the insertion movement of the engagement elements is provided, and the engagement elements then prevent loss or removal of the spring while, upon engagement with the clamping element, the element is immediately pivoted or shifted into its quiescent position.

DRAWINGS

Figure 1:
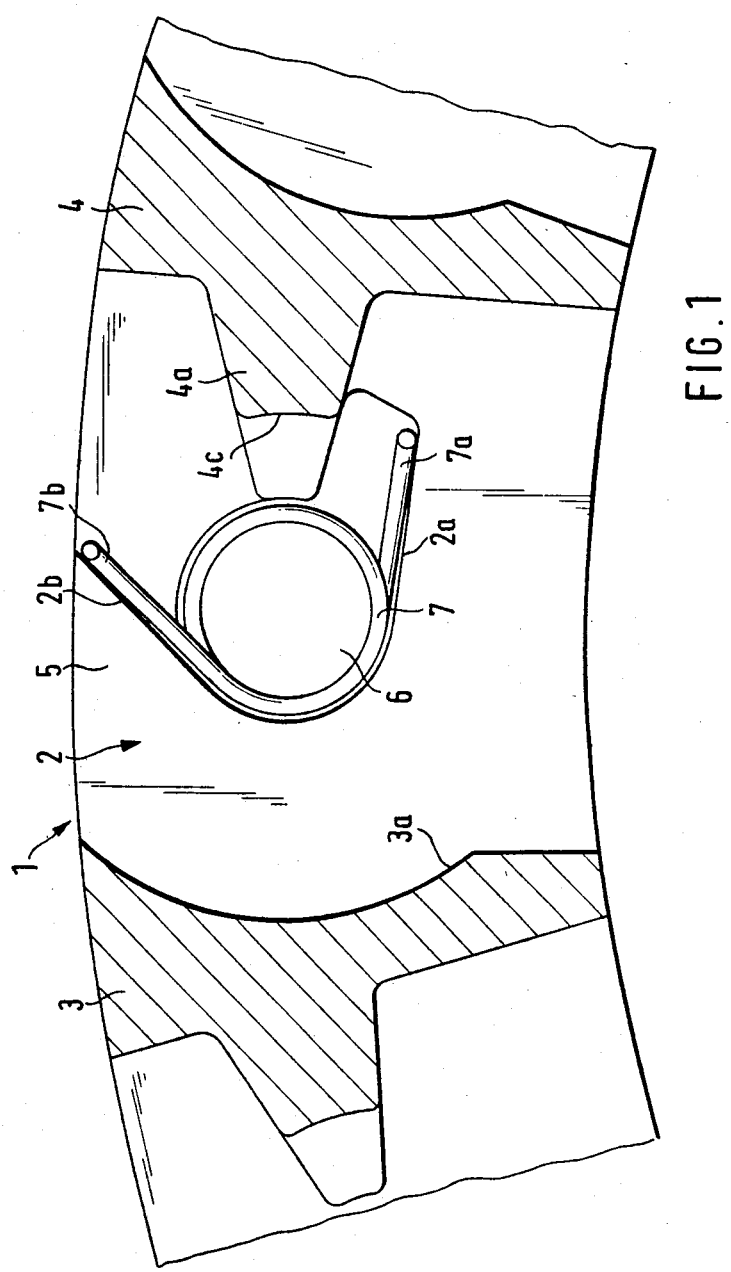
FIG. 1 is a fragmentary radial section through a clutch cage ring, without the engagement elements thereon, and with only the spring being assempled in one of the clutch element positions.

The cage ring 1—see FIG. 1—is formed with an opening 2 extending essentially radially, so that the opening 2 is open both at the outer as well as at the inner surface of the ring 1. Each opening 2 is separated from circumferentially adjacent openings by webs 3, 4, extending essentially radially. The openings 2 are all identical. The webs 3, 4 are formed on one side with a concave surface 3a, which matches the circumferential shape or surface of the engagement elements, as will appear. The other side of the webs, in FIG. 1 the web 4, has a projecting ridge or strip 4a which has a surface 4c thereon, likewise matching the circumferential surface of the engagement elements. The opening 2 is defined, in axial direction, by end walls of which, in FIG. 1, only the rear end wall 5 is visible.

The back wall 5 is formed with a circular, cylindrical depression 6. A coil spring 7, having two spring arms 7a, 7b, is fitted into the circular depression. One of the spring arms, spring arm 7a, is a support arm. The other spring arm, spring arm 7b, is the working or operating arm. The ends of the springs are angled-off in axial direction, as seen in FIG. 1, to form bearing end portions, although this is not a necessary feature.

The coil spring 7 is secured and retained within the ring or cage 1 against inadvertent removal by initially prestressing the spring arms within the ring. For such prestressing, support arm 7a is placed in engagement with a support surface 2a formed in the side wall 5. The working or operating arm 7b is in engagement with an engagement surface 2b formed in the side wall 5 of the ring or cage 1.

Assembly of the spring: The spring is inserted radially from the inside of the ring 1 into the opening 2 by pushing it into the opening until the circular coiled portion of the spring snaps into the cylindrical opening 6. To permit the spring to snap into the cylindrical opening 6, the two spring arms 7a, 7b must be slightly compressed towards each other against the spring force, with tends to spread the arms apart, so that the arms 7a, 7b can fit against the matching surfaces 2a, 2b formed in the side wall 5, and positioned within the opening 2.

Figure 2:
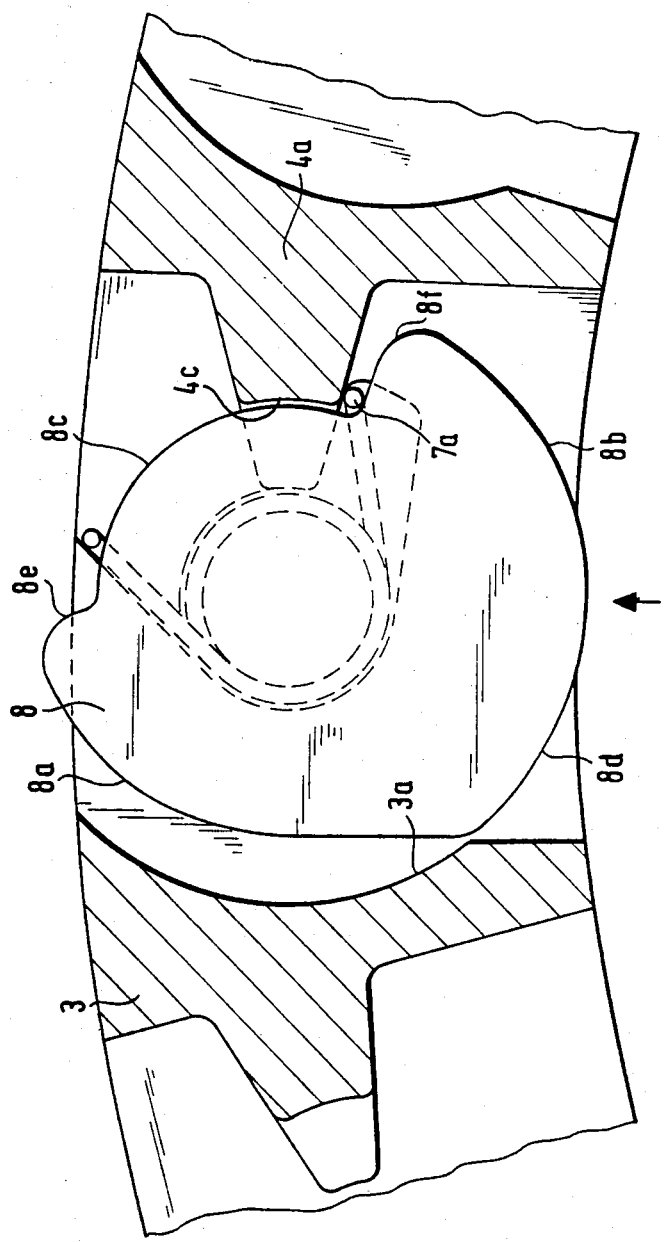
FIG. 2 is a view similar to FIG. 1, with the clutch element being inserted, but not yet in retained position.
Figure 4:
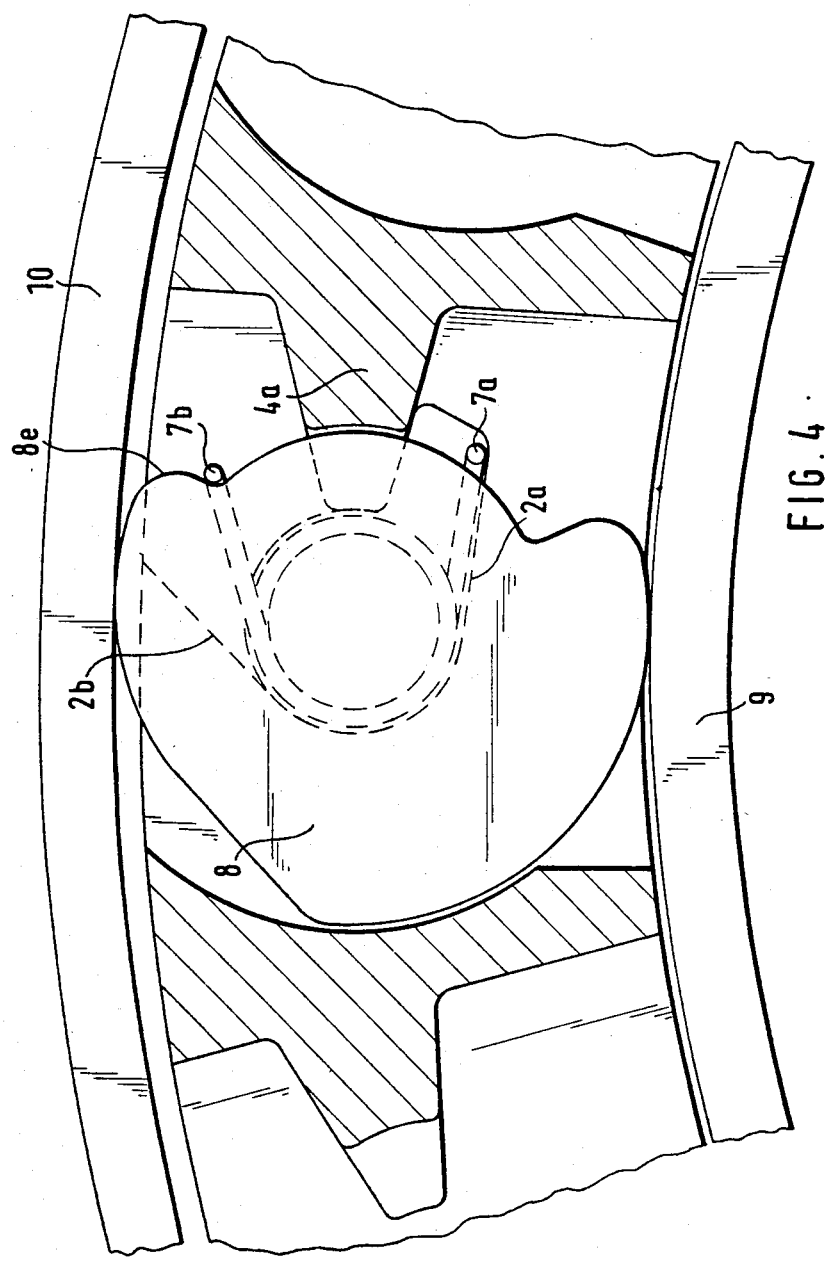
FIG. 4 is a view similar to FIG. 2, with the cage ring being assembled between an inner and outer clutching ring, and the engagement element being located in operating position.

The friction engaging elements 8—see FIG. 2—can then be assembled in the cage or ring 1. The friction engaging elements 8 have the customary convex clamping or friction engaging surfaces at their outer circumference. These friction engagement surfaces are a surface 8a for engagement with an outer ring 10 (FIG. 4) and an inner engagement surface 8b for engagement with an inner ring 9 (FIG. 4). When the engagement elements 8 are located in the opening 2 of the ring 1, the respective surfaces 8a, 8b will be positioned for selective clamping engagement with the respective outer and inner rings 10, 9, respectively.

Figure 3:
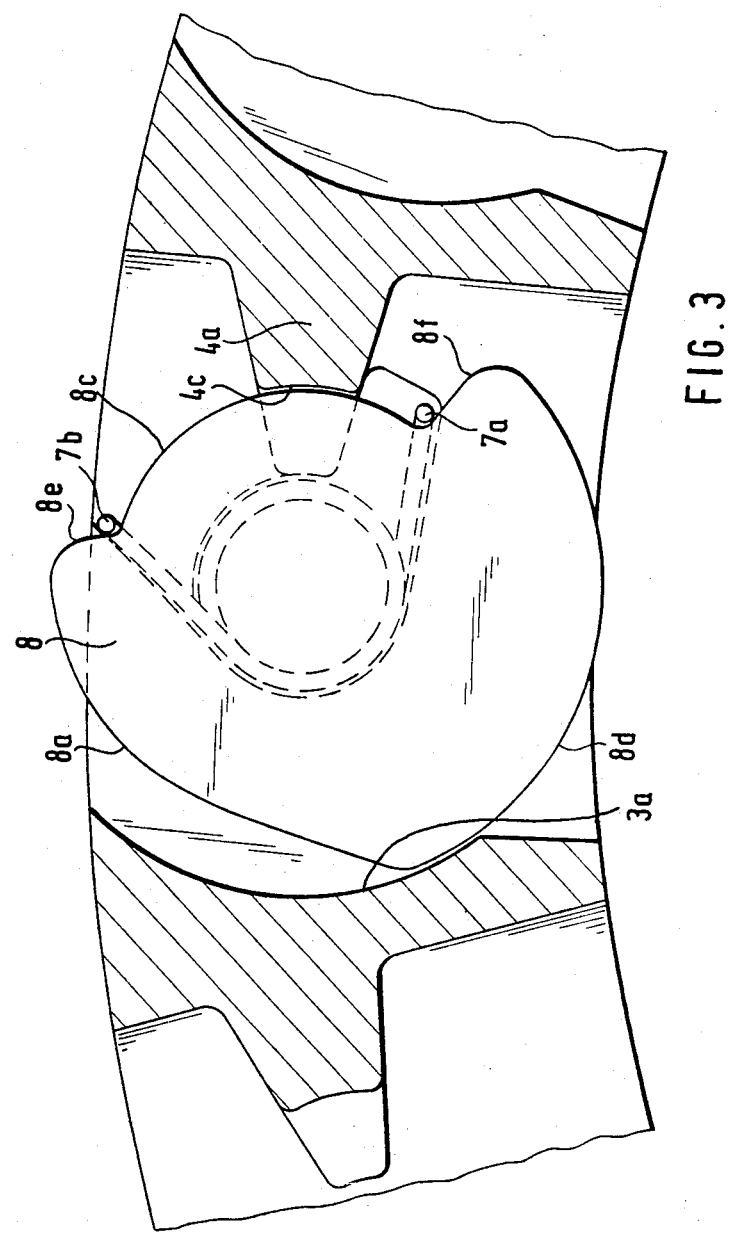
FIG. 3 is a view similar to FIG. 2, in which the clutch element is being rotated into secured position.

As best seen in FIGS. 2 and 3, essentially cylindrical guide surfaces 8c and 8d are located between the clamping or engagement surfaces 8a, 8b on the friction engagement elements 8. In the example selected, the guide surface 8d has the same diameter as the inner engagement surface 8b, and merges smoothly therewith. This, however, is not necessary. The other guide surface 8c is located on a diameter which is somewhat less, and merges with the adjacent engagement surface 8a over an essentially radially positioned spring engagement surface 8e which, also, may be termed the working or operating engagement surface, to engage with the working or operating arms 7b of the spring. The guide surface 8c is joined to the inner engagement surface 8b by an essentially radially extending abutment surface 8f.

Of course, the clamping elements may have a different circumferential shape or profile. In accordance with a feature of the invention, however, it is necessary that abutment surfaces or abutment means be provided for the two arms of the spring 7, and that, further, the opening 2 in the ring 1 as well as the surfaces of the engagement elements 8 are so matched to each other that the engagement elements can be inserted in a predetermined angular position radially from the inside or from the outside—in the example selected radially from the inside—into the opening 2 and, by subsequent rotation, will be retained in position with respect to radial removal. The structure of the referenced U.S. Pat. No. 3,598,212 also prevents radial removal upon rotation of the clamping elements or sprags after insertion; in accordance with the referenced U.S. patent, removal of the sprags, after insertion, is obtained by the particular pinched or hourglass shape of the sprags which, however, cannot be obtained if the engagement elements 8 have essentially circular cross section, as shown in FIGS. 2–4 in accordance with the present invention.

Assembly of engagement elements 8: FIG. 2 illustrates the engagement element 8 in an angular position which is shifted by about 30° with respect to its normal inserted or quiescent position. It can be inserted in this, pivoted or rotated, position from the inside of the ring 1 into the opening 2. Upon such insertion, the engagement or support surface 8f will become engaged with the support arm 7a of the spring 7, or with the angled-off end portion thereof—see FIG. 2. The support arm 7b will, by insertion movement of the engagement element 8, be pressed upwardly—see FIG. 2—counter the spring force thereof, until the support arm 7a will engage the projection 4a forming the subdivision between the axially located ring portions. This abutment or stop surface is formed in the example shown by the radial inwardly projecting surface of the strip 4a of the cage. It prevents further insertion of the element 8 in radial direction into the opening 2 and, due to lateral engagement with the engaging element 8, automatically changes the radially outwardly directed insertion movement into a pivoting or rotating movement, which rotates the engaging element 8 in clockwise direction. The guide surface 8d is thereby moved into the concave portion of the guide surface 3a in the subdivision 3. This pivoting or rotary movement will continue until the support arm 7a, engaged with the support or engagement surface 8f of the engaging element 8, has reached its quiescent or rest position on the support surface 2a within the opening 2. In this position, the engagement element 8 will have its working or operating surface 8e located adjacent the working or operating spring arm 7b. This quiescent or rest position is illustrated in FIG. 3.

FIG. 3 clearly shows that the support arm 7a of the spring 7 prevents return rotation of the engaging element 8, that is, in the direction of insertion movement as shown in FIG. 2, so that loss or removal of the engagement element 8 is prevented. The guide surface 8d is retained automatically in the concave region of the guide surface 3a in the subdivision or strip or web 3. The engaging element 8 thus cannot be removed radially outwardly either, since the projection 4a, with its concave surface 4c, surrounds the engagement element 8 at a level which is not only below, but also above the axis of rotation of the engaging element 8 itself.

The finally assembled cage ring can then be assembled between an inner free-wheeling ring 9 and or an outer free-wheeling ring 10—see FIG. 4. Upon such assembly, the operating or working arm 7b is compressed towards the support arm 7a; the engagement element 8 is further rotated in clockwise direction. Such rotation causes the working or operating arm 7b to be carried along and to be removed from the corresponding support surface 2b within the opening 2, by engagement with the corresponding working or operating support surface 8e of the engagement element 8. The spring, thus, can carry out its customary and usual function, by biassing the engagement element in the direction to frictional engagement position with the inner and outer ring upon relative rotation of the respective rings 9, 10 to permit sliding of the rings in one direction, but interference or jamming of the engaging elements 8 when subjected to reverse direction of the rotation. The support arm 7a of the spring 7 is out of engagement with the engagement element 8 and is supported only on the respective support surface 2 of the ring, thus carries out only its support function, namely to provide a counter force to the biassed spring arm 7b. The surface 2a within the opening 2 thus forms a counter surface for the spring arm 7a.

To prevent excessive deflection of the working or operating arm 7b of the spring 7, and thus possibly distort the spring, it is desirable, in accordance with a feature of the invention, to match the quiescent position of the spring arm 7b roughly to the quiescent position of the engagement element 8, when inserted. Thus, the spring arm 7b is activated only when the engagement element 8 is pivoted or tilted into its operating position. Preferably, the surface 2b is arranged to define a limiting deflection distance of the arm 7b.

The ring 1, suitably, is a unitary element which may, for example, be a casting. The springs 7 then can be located, in well known manner, in suitable openings formed in the ring. These openings, that is, the cylindrical openings 6, merge with the respective abutment or engagement surfaces 2a, 2b for the spring arms. This provides some pre-stressing or initial bias for the springs when inserted within the cage ring 1, so that the springs can be easily placed and will remain within the cage for subsequent assembly of the engagement elements 8, without additional holding elements or jigs.

Various changes and modifications may be made in the shape of the engagement elements 8. In a preferred form, the engagement elements 8 have essentially circular or round surfaces which are shaped to form, additionally, the transition or abutment surfaces 8e, 8f, for the operating arms 7b, 7a of the spring. This results in engagement elements which can be made at low cost, since they are, essentially, of at least particular profile. The grooves or recesses which correspond to or engage the respective spring arms are connected by a circumferential surface of reduced diameter, which, overall, results in simple shaping of the elements at low energy requirements for shaping the elements 8.

It is also possible to use engagement elements in which the center of gravity is shifted laterally with respect to the pivot axis of the engagement elements. Centrifugal force lift-off from the outer ring can also be obtained by radially supporting the engagement elements, as described, for example, in the referenced U.S. Pat. No. 3,792,649, GIESE et al.

Various other changes and modifications may be made within the scope of the inventive concept.

We claim:

1. A clutch element holding cage ring (1) for a one-way clutch, having radially insertable;
   friction engagement elements (8) secured to the cage ring between two radially extending surfaces (5) and the axially extending surfaces (3a, 4c), and pivotably mounted thereon for engagement with clutching rings (9,10) in one relative direction of rotation of said rings and sliding contact on the clutching rings in a reverse direction of rotation;
   and spring elements (7) engageable with the friction engagement elements (8), said spring elements being located at a radial surface (5) of the cage ring, wherein, in accordance with the invention,
   the spring element comprises a spring (7) having a pair of projecting spring arms (7a, 7b) which are resiliently biased for spreading-apart movement in essentially parallel planes;
   the engagement elements have a first or spring working attachment surface (8e) for engagement with one of the arms (7b) and a second or spring deflecting surface (8f) for engagement with the other one (7a) of the arms;
   and the engagement elements (8) as well as the cage ring (1) are formed with a first matching cooperating surface pair (3a, 8d) and an essentially oppositely positioned second matching cooperating surface pair (4c, 8c) located at different positions with respect to the pivot axis of a respective engagement element than said first matching surface pair, engagement of the second or spring deflecting surface (8f) of the engagement element by the other spring arm (7a) rotating the element about a pivot axis to a position in which said cooperating surface pairs are opposite each other to prevent inadvertent shift of the engagement elements with respect to the pivot axis in radial direction and thereby retain said engagement elements on the cage ring in loss-preventing position.

2. A cage ring according to claim 1, wherein the holding ring (1) includes at least one abutment surface (2a) limiting the deflection range of the other arm (7a) of said spring element.

3. A cage ring according to claim 1, wherein the spring element comprises a spiral spring and said spring arms (7a, 7b9 extend from the spiral spring in essentially tangential direction;

and wherein the position of the first or spring working engagement surface (8e) in engagement with said one of the spring arms (7b) corresponds approximately to the unstressed or quiescent position of said one of said arms.

4. A cage ring according to claim 3, further including an engagement support surface (2b) formed on said radial surface (5) and defining a quiescent or stop position of the first one of said arms (7b) of the spring (7).

5. A cage ring according to claim 1, wherein said holding cage ring (1) is a unitary element.

6. A cage ring according to claim 1, wherein said radial surface (5) is formed with a depression (6) shaped to receive and retain the spring element (7).

7. A cage ring according to claim 1, wherein said spring element (7) comprises a coil spring;

and said axial surface (5) is formed with an essentially cylindrical depression (6) fitting around and retaining the coil spring (7) therein.

8. A cage ring according to claim 1, wherein the engagement elements (8) comprise disk or plate-like elements having essentially circular plan outline on which said respective first and second engagement surfaces and the respective surfaces of the surface pairs are formed.

9. A cage ring according to claim 1, wherein the engagement elements (8) have centers of gravity which are non-congruent with the pivot axis of the engagement elements.

10. A cage ring according to claim 1, wherein the engagement elements (8) comprise essentially plate or disk-like elements having a pivot axis;

a first part-circular circumferential surface (8d) concentric with respect to said pivot axis, and forming one cooperating surface of the first surface pair (3a, 8d);

a second part-circular surface (8c) concentric with said pivot axis and of lesser radial distance than said first surface, and forming the second matching surface of the second surface pair (8c, 4c);

the first or spring working engagement surface (8e) forming a transition surface between said first and second part-circular surfaces, and the second or spring deflecting surface (8f) forming a second transition surface between said part-circular surfaces, said first and second engagement surfaces extending approximately radially with respect to the pivot axis to permit engagement thereagainst by the terminal ends of said spring arms (7a, 7b).

11. A cage ring according to claim 10, wherein the spring element (7) comprises a coil spring positioned coaxially with respect to said pivot axis and the spring arms extend essentially tangentially from said coil spring and are formed with end portions adapted for engagement with said first and second engagement surfaces (8e, 8f) of the engagement element.

12. A cage ring according to claim 11, wherein the cage ring (1) is formed with radial openings (2) on which said radially extending surfaces (5) are located to permit radial insertion of said engagement elements;

and wherein the first cooperating surface pair (3a, 8d), when the engagement element (8) is in inserted position, is located circumferentially beyond the insertion opening, and said other spring arm (7a), by engagement with the second or spring deflecting surface (8f), retains said first surface pair in matching, facing position, thereby preventing unintended radial removal of the respective engagement element (8) through the insertion opening.

13. A cage ring according to claim 1, wherein said first surface pair (3a, 8d) and said second surface pair (4c, 8c) both have portions which are on both sides of a theoretical diametrical line connecting said surface pairs and passing through said pivot axis.

14. A cage ring according to claim 10, wherein said first surface pair (3a, 8d) and said second surface pair (4c, 8c) both have portions which are on both sides of a theoretical diametrical line connecting said surface pairs and passing through said pivot axis.

* * * * *